(12) United States Patent
Fink

(10) Patent No.: US 10,279,699 B2
(45) Date of Patent: May 7, 2019

(54) ON-BOARD ELECTRICAL SYSTEM, AND METHOD FOR OPERATING AN ON-BOARD ELECTRICAL SYSTEM

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 192 days.

(21) Appl. No.: 15/114,524

(22) PCT Filed: Jan. 23, 2015

(86) PCT No.: PCT/EP2015/051378
§ 371 (c)(1),
(2) Date: Jul. 27, 2016

(87) PCT Pub. No.: WO2015/110591
PCT Pub. Date: Jul. 30, 2015

(65) Prior Publication Data
US 2016/0339795 A1    Nov. 24, 2016

(30) Foreign Application Priority Data

Jan. 27, 2014  (DE) .................. 10 2014 201 351

(51) Int. Cl.
*B60L 11/18* (2006.01)
*B60R 16/033* (2006.01)
(Continued)

(52) U.S. Cl.
CPC ....... *B60L 11/1853* (2013.01); *B60L 11/1855* (2013.01); *B60L 11/1861* (2013.01);
(Continued)

(58) Field of Classification Search
CPC .................. B60L 11/006; B60L 11/1803; B60L 2220/18; B60L 7/14; B60L 7/22;
(Continued)

(56) References Cited

FOREIGN PATENT DOCUMENTS

| DE | 100 57 259 A1 | 5/2002 |
|---|---|---|
| DE | 10 2005 038 746 A1 | 3/2007 |

(Continued)

OTHER PUBLICATIONS

Anonymous et at., Seriell + Paralell bei Blei-Gel Akku?, RC-Network.de, Sep. 13, 2010.
(Continued)

*Primary Examiner* — Nathaniel R Pelton
*Assistant Examiner* — Michael N Dibenedetto
(74) *Attorney, Agent, or Firm* — Maginot, Moore & Beck LLP

(57) ABSTRACT

An on-board electrical system for a motor vehicle is disclosed. The on-board electrical system has a low-voltage subsystem for at least one low-voltage load, and has a high-voltage subsystem for at least one high-voltage load, and has a starter generator, wherein the high-voltage subsystem is connected to the low-voltage subsystem by means of a coupling unit, wherein the on-board electrical system has a battery which has at least two battery units having individual voltage taps which are routed to the coupling unit. In this case, the coupling unit is designed such that, in a first operating state, the high-voltage subsystem is fed from all of the battery units and the low-voltage subsystem is fed from one battery unit, and, in a second operating state, the high-voltage subsystem is fed from one battery unit and the low-voltage subsystem is fed from at least one battery unit.

10 Claims, 9 Drawing Sheets

(51) Int. Cl.
*H02J 7/00* (2006.01)
*B60W 20/13* (2016.01)
*B60W 10/26* (2006.01)
*H02J 7/34* (2006.01)

(52) U.S. Cl.
CPC ........ *B60L 11/1864* (2013.01); *B60R 16/033* (2013.01); *B60W 10/26* (2013.01); *B60W 20/13* (2016.01); *H02J 7/0024* (2013.01); *H02J 7/0054* (2013.01); *H02J 7/0068* (2013.01); *H02J 7/34* (2013.01); *B60L 2260/20* (2013.01); *B60L 2260/22* (2013.01); *B60L 2260/24* (2013.01); *B60L 2260/26* (2013.01); *Y02T 10/7005* (2013.01); *Y02T 10/7055* (2013.01); *Y02T 10/7061* (2013.01); *Y10S 903/907* (2013.01)

(58) Field of Classification Search
CPC .... B60L 11/1853; B60L 11/123; B60L 11/16; B60L 11/18; B60L 11/1861; B60L 11/1859; B60L 11/1881; B60L 11/1883; B60L 2260/22; B60L 2260/24; B60L 2260/26; B60W 20/00; B60W 2510/244; B60W 10/06; B60W 10/26; B60W 10/28; B60W 2550/142; B60W 20/13; H01M 10/42; H02J 7/0024; H02J 7/0054; H02J 7/0068; H02J 7/14; H02J 7/1423; H02J 7/34; Y02T 10/7005; Y02T 10/7055

USPC .................. 320/117, 119, 120, 121, 122
See application file for complete search history.

(56) References Cited

FOREIGN PATENT DOCUMENTS

| | | | |
|---|---|---|---|
| DE | 10 2008 002 177 A1 | 12/2009 | |
| DE | 10 2009 024 345 A1 | 1/2011 | |
| DE | 10 2009 046 305 A1 | 5/2011 | |
| DE | 10 2009 046 553 A1 | 5/2011 | |
| DE | 10 2010 014 104 A1 | 10/2011 | |
| DE | 10 2012 010 711 A1 | 3/2013 | |
| DE | 10 2012 003 309 A1 | 8/2013 | |
| EP | 1 562 252 A1 | 8/2005 | |
| EP | 2 496 437 | 5/2011 | |
| WO | 01/37393 A1 | 5/2001 | |
| WO | WO 0137393 A1 * | 5/2001 | ............ H02J 7/0024 |
| WO | 2011/055217 A2 | 5/2011 | |
| WO | WO 2012120030 A1 * | 9/2012 | .......... B60L 11/1853 |

OTHER PUBLICATIONS

International Search Report corresponding to PCT Application No. PCT/EP2015/051378, dated Apr. 21, 2015 (German and English language document) (7 pages).

* cited by examiner

ON-BOARD ELECTRICAL SYSTEM, AND METHOD FOR OPERATING AN ON-BOARD ELECTRICAL SYSTEM

This application is a 35 U.S.C. § 371 National Stage Application of PCT/EP2015/051378, filed on Jan. 23, 2015, which claims the benefit of priority to Serial No. DE 10 2014 201 351.8, filed on Jan. 27, 2014 in Germany, the disclosures of which are incorporated herein by reference in their entirety.

BACKGROUND

The disclosure relates to an onboard electrical system for a motor vehicle and to a motor vehicle having such an onboard electrical system.

In motor vehicles having an internal combustion engine, an onboard electrical system that is operated at 12 V as standard is provided for supplying power to the electric starter for the internal combustion engine and to further electrical apparatuses of the motor vehicle. When starting the internal combustion engine, the onboard electrical system is used to provide a voltage from a starter battery for a starter that starts the internal combustion engine when a switch is closed, for example by an appropriate starter signal. Once the internal combustion engine has been started, it drives an electrical generator that then produces a voltage of approximately 12 V and provides it for the various electrical loads in the vehicle via the onboard electrical system. In so doing, the electrical generator also recharges the starter battery loaded by the starting process. When the battery is charged via the onboard electrical system, the actual voltage may also be above the rated voltage, e.g. at 14 V or at 14.4 V. The onboard electrical system at a voltage of 12 V or 14 V is also referred to as a low voltage onboard electrical system within the context of the present disclosure.

It is known practice to use a further onboard electrical system having a rated voltage of 48 V in electric and hybrid vehicles, said system also being referred to as a high voltage onboard electrical system within the context of the disclosure.

SUMMARY

The disclosure provides an onboard electrical system for a motor vehicle, wherein the onboard electrical system has a low voltage subsystem for at least one low voltage load and a high voltage subsystem for at least one high voltage load and a starter generator, wherein the high voltage subsystem is connected to the low voltage subsystem by means of a coupling unit that is set up to draw power from the high voltage subsystem and to supply it to the low voltage subsystem, wherein the high voltage subsystem has a battery that is set up to produce the high voltage and to output it to the high voltage subsystem, and that has at least two battery units having individual voltage taps that are routed to the coupling unit, wherein the coupling unit is set up to provide at least a first and a second operating state, wherein in the first operating state, the high voltage subsystem is fed from all the battery units of the battery and the low voltage subsystem is fed from one battery unit, and in the second operating state, the high voltage subsystem is fed from one battery unit and the low voltage subsystem is fed from at least one battery unit.

The disclosure has the advantage that the low voltage subsystem can operate electrical low voltage loads that are designed for a low first voltage, and high voltage loads have the high voltage subsystem available, i.e. the onboard electrical subsystem having a voltage that is increased in comparison with the first voltage. The supply of power to the low voltage subsystem is overlaid on the charging and discharge processes in the high voltage subsystem. The supply of power to the low voltage subsystem via the high voltage subsystem takes place unidirectionally in this case, i.e. the coupling unit provides the transfer of power preferably only in one direction.

The onboard electrical system can be used both for static applications, e.g. for wind power installations, and in vehicles, e.g. in hybrid and electric vehicles. In particular, the onboard electrical system can be used for vehicles that have start/stop systems.

The presented system, i.e. the onboard electrical system and an associated controller, for example a battery management system, is particularly suitable for use in vehicles that have a 48 volt generator and a 14 volt starter, the 14 volt starter preferably being designed for start/stop systems.

The presented system is particularly suitable for use in vehicles that have a boost recuperation system (BRS). In boost recuperation systems (BRS), electric power is obtained during braking processes, during descents or when coasting so as thereby to supply power to the electrical loads. The BRS increases the efficiency of the system, which means that fuel can be saved and emissions can be reduced. The battery in the high voltage subsystem can support the internal combustion engine in this case, this being referred to as what is known as boost, or can even be used for purely electric driving for short distances at low speeds, e.g. in the case of electric parking and exit from a parking space.

In the present description, the terms "battery" and "battery unit" are used for storage battery or storage battery unit, in a manner adjusted to customary usage. The battery comprises one or more battery units, which can denote a battery cell, a battery module, a module string or a battery pack. In this case, the battery cells are preferably spatially combined and connected to one another in terms of circuitry, for example interconnected serially or in parallel to form modules. Multiple modules can form what are known as battery direct converters (BDCs) and multiple battery direct converters can form a battery direct inverter (BDI).

Advantageous developments and improvements in the subject specified in the disclosure are possible by virtue of the measures described herein.

It is thus advantageous if the selectively connectable battery units are each designed to provide the low voltage. The battery units can thus be used alternately to provide the low voltage, e.g. in order to support a start/stop system, which results in an increased life for the battery unit.

According to one preferred embodiment, the coupling unit has at least one switch with reverse blocking capability. Preferably, the switches with reverse blocking capability are suitable for connecting and disconnecting a selectively connectable battery unit to/from the low voltage subsystem. These switches have the property that they allow a flow of current only in one direction in the "on" state and can accept a blocking voltage having both polarities in the "off" state.

When a battery unit is connected to the low voltage subsystem, preferably at least one switch with reverse blocking capability, particularly preferably two switches with reverse blocking capability, is/are operated. When a battery unit is disconnected from the low voltage subsystem, likewise preferably at least one switch with reverse blocking capability, particularly preferably two switches with reverse blocking capability, is/are operated.

According to one preferred embodiment, the coupling unit has at least one switch with forward blocking capability. Preferably, the switches with forward blocking capability are suitable for series connection of the selectively connectable battery units.

Preferably, provision is made for breakage of the line between two battery units to prompt at least one switch with forward blocking capability to be operated. Similarly, provision is preferably made for connection of the line between the battery units to prompt at least on switch with forward blocking capability to be operated.

According to one preferred embodiment, the coupling unit is set up to connect at least two battery units in parallel with one another for the low voltage subsystem. Particularly preferably, in the second operating state, at least two, preferably all, battery units are connected in parallel with one another for the low voltage subsystem. This allows differing states of charge of the two battery units to prompt the low voltage subsystem to be supplied with power from that battery unit that has the higher state of charge or provides the higher voltage. When the states of charge of the battery units are the same or similar, the low voltage subsystem is supplied with power from both battery units.

According to one preferred embodiment, the coupling unit is set up to connect at least two battery units in series, i.e. in series with one another, for the high voltage subsystem. Particularly preferably, in the first operating state, at least two battery units are connected in series for the high voltage subsystem. Additionally, provision may be made for the low voltage subsystem to have at least one capacitor. The capacitor is preferably set up to stabilize the low voltage when the connected battery unit changes. The capacitor is furthermore preferably also suitable as an energy store that is set up to produce the low voltage, and to supply it to the low voltage subsystem, at least in the short term.

The voltage dip in the low voltage subsystem can additionally advantageously be decreased if changeover is effected at times at which the onboard electrical system current is as small as possible. This can be accomplished by evaluating a signal for the onboard electrical system current and actuating the switches of the coupling unit on the basis thereof, for example. Furthermore, synchronization to a load management system can also be effected in order to disconnect high voltage loads, such as e.g. heating systems, temporarily without losses of comfort in order to allow the changeover process for the battery units without a significant voltage dip.

Preferably, the coupling unit is set up to provide at least one further operating state, wherein in the further operating state, the high voltage subsystem is fed from multiple, particularly two, three or four, battery units and the low voltage subsystem is fed from multiple, particularly two, three or four, parallel-connected battery units.

Preferably, the onboard electrical system has a controller for controlling the coupling unit for the purpose of connecting the battery units. By way of example, the controller may be associated with a battery management system that is associated with the battery and that comprises further units, for example, that are set up to record measurement data about temperatures, voltages provided, currents output and states of charge of the battery or of the battery units, to process them and to make statements about the state of health of the battery, for example, therefrom. The controller for controlling the coupling unit can have a computer program that carries out one of the methods according to the disclosure.

According to the disclosure, a motor vehicle having an internal combustion engine and one of the onboard electrical systems described above is furthermore specified.

In the case of a method according to the disclosure for operating one of the onboard electrical systems described above, the coupling unit is controlled to set the first or second operating state on the basis of an operating phase of the motor vehicle.

In this case, a first operating phase may be a switched-off vehicle or parked vehicle, a second operating phase may be a motor vehicle start, a third operating phase may be a start/stop mode of the motor vehicle and/or a fourth operating phase may be a driving mode of the motor vehicle.

Preferably, the second operating state is set in the first operating phase, i.e. when a vehicle is switched off or a vehicle is parked.

Preferably, multiple, preferably all, battery units are connected in series for the high voltage subsystem in the second operating phase. The second operating phase may particularly be a starting state of a motor vehicle, for example even a cold starting state of a motor vehicle, the latter being able to be defined by a defined period elapsing, for example after 10 min, 20 min, 1 h, 2 h, 12 h or 24 h has/have elapsed.

Preferably, multiple, preferably all, battery units are connected in series for the high voltage subsystem in the fourth operating phase, i.e. during the driving mode of the motor vehicle.

Preferably, the third operating phase comprises a start operating state and a stop operating state. In the case of the start operating state, the settings are preferably chosen on the basis of the settings for the second operating phase, and in the case of the stop operating state, the settings are chosen on the basis of the settings for the first operating phase.

Preferably, that battery unit that has the highest state of charge at a given time is used to supply power to the low voltage subsystem. In particular, it is also preferred that in the first operating state, the low voltage subsystem is supplied with power from that battery unit that has the highest state of charge. When looking at an optimized operating strategy for the onboard electrical system with the series circuit shown for the battery units, the considerations that follow are employed. In this case, it is assumed that for uniformly aged cells, the internal resistance and the capacitance of the cells are approximately the same for the same reference conditions, i.e. essentially the same temperature and the same state of charge.

For uniformly aged cells, the maximum outputtable power is limited by that cell having the lowest state of charge.

For uniformly aged cells, the maximum drawable power is limited by the cell having the lowest state of charge.

For uniformly aged cells, the maximum permissible power for charging processes is limited by the cell having the highest state of charge.

For uniformly aged cells, the maximum supplyable power is limited by the cell having the highest state of charge.

Since the battery system in a boost recuperation system needs to be capable of storing as much power as possible during a braking process at any time, and at the same time needs to be capable of supporting a boost process as well as possible, it is possible to infer therefrom the requirement that the battery units and the cells they contain should all have the same state of charge as far as possible in order to meet the stipulated requirements as well as possible.

In addition to the requirements of the high voltage subsystem, requirements for the starting processes in the low voltage subsystem are also stipulated for the system. So that these requirements are met as well as possible by means of a combination of the high power energy store and the battery, preferably that battery unit that has the highest state of charge at a given time is used to supply power to the low voltage subsystem.

The requirements for the selection of the switching states of the coupling unit can be met using the following operating strategy: the low voltage subsystem is always supplied with power from that battery unit that currently has the highest state of charge. Since the supply of power to the low voltage subsystem is overlaid on the charging and discharge processes in the high voltage subsystem and the supply of power to the low voltage subsystem takes place unidirectionally, this selection specification ensures that the battery unit having the highest state of charge is discharged more quickly or is charged more slowly than the other battery units. This results in the states of charge of the battery units being balanced.

So that, when the state of charge of the battery units is the same, there is not a very rapid change from one battery unit to the next, a threshold value for the difference $\Delta SOC_{changeover}$ between the states of charge is introduced, e.g. a difference $\Delta SOC_{changeover}$ having a defined value of between 0.5% and 20%, preferably between 1% and 5%, particularly preferably approximately 2%, that needs to be exceeded so that the supply of power to the low voltage subsystem changes from one battery unit to that battery unit that has a correspondingly higher state of charge than the battery unit that is currently used to supply power to the low voltage subsystem. The changeover for the supply of power is always made toward that battery unit that currently has the highest state of charge, and the changeover is made when the battery unit that is currently connected for the purpose of supplying power to the low voltage subsystem has a state of charge that is lower by at least $\Delta SOC_{changeover}$ than the state of charge of that battery unit that has the highest state of charge.

The disclosure provides an inexpensive onboard electrical system having a lithium ion battery system for vehicles that has a high voltage subsystem, a low voltage subsystem and a boost recuperation system with unidirectional supply of power to the low voltage subsystem. In this case, a potential-isolating DC/DC voltage converter (DC/DC converter), and also the lead acid battery, can be dispensed with in comparison with known systems. Furthermore, there is no need for a separate starter in the low voltage subsystem. The system is therefore distinguished by a reduced volume and by a lower weight in comparison with BRS systems that are currently under development. Given suitable design the boost recuperation system can furthermore store much more energy, and thereby recover more electric power in the system during longer braking processes or descents, in comparison with BRS systems that are currently under development.

The effect achieved by the specification according to the disclosure for selecting the switching states of the coupling unit is that the battery can perform necessary tasks in optimized fashion in different operating phases of the onboard electrical system. In particular, the supply of power to the low voltage subsystem is ensured. In this case, power is supplied with as little interruption as possible, i.e. preferably without voltage dips. Should uninterrupted supply of power to the low voltage subsystem not be possible for a short time during changeover phases of the coupling unit, then the voltage dip in the low voltage subsystem is nevertheless limited to tolerable values. Furthermore, the battery provides sufficient electric power even during longer periods of nonuse. The battery can supply power to high voltage loads even during stop phases in start/stop mode.

Furthermore, the supply of power to the high voltage subsystem is ensured, i.e. the battery provides the electric power for the high voltage subsystem essentially without interruption for the necessary operating states. In respect of the storage of electric power, the optimization means that as much electric power as possible can be recovered during a braking process and that the battery can then be charged with the highest powers possible. In respect of the provision of the electric power, the optimization means that the battery allows the starting processes by providing electric power at the required voltage and output level and that as much electric power as possible can be provided for the boost mode.

BRIEF DESCRIPTION OF THE DRAWINGS

Exemplary embodiments of the disclosure are presented in the drawings and explained in more detail in the description that follows. In the drawings.

DETAILED DESCRIPTION

Figure 1:
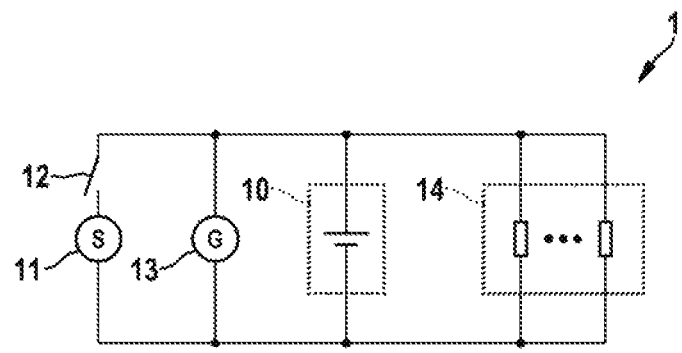
FIG. 1 shows a low voltage onboard electrical system according to the prior art.

FIG. 1 shows an onboard electrical system 1 according to the prior art. When starting an internal combustion engine, the onboard electrical system 1 is used to provide a voltage from a starter battery 10 for a starter 11 that starts the internal combustion engine (not shown) when a switch 12 is closed, for example by an appropriate starter signal. Once the internal combustion engine has been started, it drives an electrical generator 13 that then produces a voltage of approximately 12 volts and provides it for the various electrical loads 14 in the vehicle via the onboard electrical system 1. In so doing, the electrical generator 13 also recharges the starter battery 10 loaded by the starting process.

Figure 2:
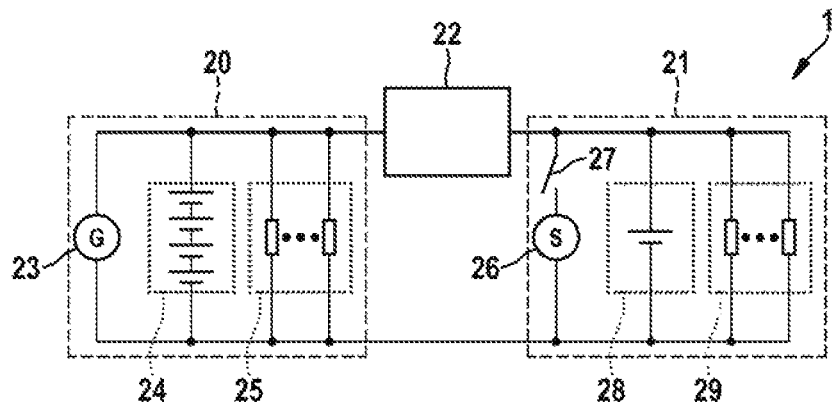
FIG. 2 shows an onboard electrical system with a high voltage subsystem and a low voltage subsystem and a unidirectional, potential-isolating DC/DC voltage converter.

FIG. 2 shows an onboard electrical system 1 with a high voltage subsystem 20 and a low voltage subsystem 21 and a unidirectional, potential-isolating DC/DC converter 22 that forms a coupling unit between the high voltage subsystem 20 and the low voltage subsystem 21. The onboard electrical system 1 may be an onboard electrical system of a vehicle, particularly a motor vehicle, transport vehicle or forklift truck.

By way of example, the high voltage subsystem 20 is, for example, a 48 volt onboard electrical system having an electrical generator 23 that can be operated by an internal combustion engine (not shown). In this exemplary embodiment, the generator 23 is designed to take a rotary movement of the engine of the vehicle as a basis for producing electric power and supplying it to the high voltage subsystem 20. The high voltage subsystem 20 additionally comprises a battery 24 that may be in the form of a lithium ion battery, for example, and that is set up to supply the necessary operating voltage to the high voltage subsystem 20. The high voltage subsystem 20 contains further load resistors that may be formed by at least one, preferably by a plurality of, electrical high voltage load(s) 25 of the motor vehicle, for example, that are operated at the high voltage.

The low voltage subsystem 21, which is arranged on the output side of the DC/DC converter 22, contains a starter 26 that is set up to close a switch 27 in order to start the internal combustion engine, and an energy store 28 that is set up to provide the low voltage at the level of 14 V, for example, for the low voltage subsystem 21. The low voltage subsystem 21 contains further low voltage loads 29 that are operated at the low voltage. By way of example, the energy store 28 comprises electrochemical cells, particularly those of a lead acid battery, which usually has a voltage of 12.8 volts in the fully charged state (state of charge, SOC=100%). When the battery is discharged (state of charge, SOC=0%), the energy store 28 has a terminal voltage of typically 10.8 volts in the unloaded state. During driving mode, the onboard electrical system voltage in the low voltage subsystem 21 is approximately in the range between 10.8 volts and volts, depending on the temperature and the state of charge of the energy store 28.

The input side of the DC/DC converter 22 is connected to the high voltage subsystem 20 and to the generator 23. The output side of the DC/DC converter 22 is connected to the low voltage subsystem 21. The DC/DC converter 22 is designed to receive a DC voltage received on the input side, for example a DC voltage at which the high voltage subsystem is operated, for example between 12 and 48 volts, and to produce an output voltage that is different than the voltage received on the input side, particularly to produce an output voltage that is lower than the voltage received on the input side, for example 12 V or 14 V.

Figure 3:
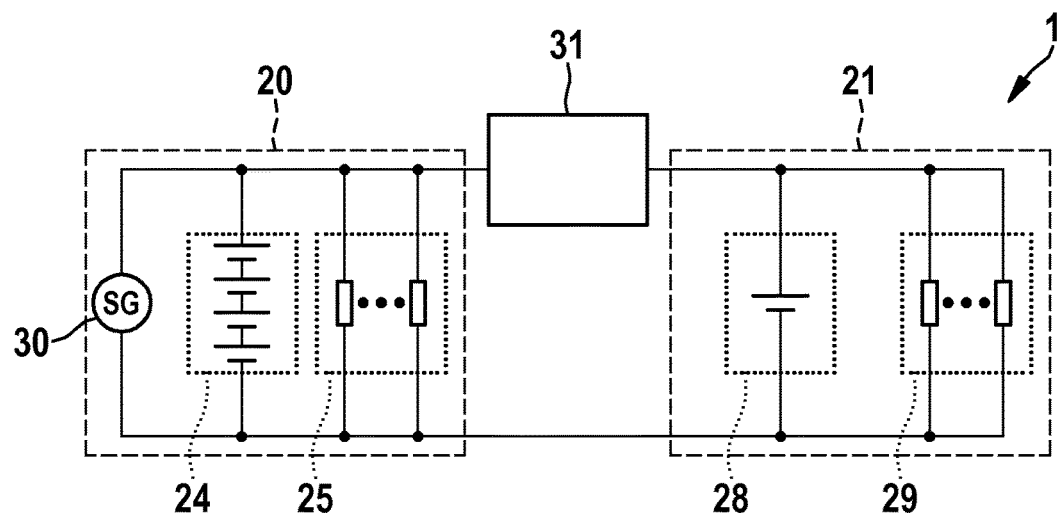
FIG. 3 shows an onboard electrical system with a high voltage subsystem and a low voltage subsystem and a bidirectional, potential-isolating DC/DC voltage converter.

FIG. 3 shows an onboard electrical system 1 with a high voltage subsystem 20 and a low voltage subsystem 21 that are connected by a bidirectional, potential-isolating DC/DC converter 31. The onboard electrical system 1 shown is essentially designed in the manner of the onboard electrical system shown in FIG. 2, wherein the generator is incorporated in the high voltage subsystem and a DC/DC converter 31, which is of potential-isolating design, is used for transferring power between the onboard electrical subsystems 20, 21. Both subsystems 20, 21 furthermore contain loads 25, 29, as described with reference to FIG. 2. Essentially, the system shown in FIG. 3 is distinguished by virtue of the incorporation of the starter. While the starter 26 is arranged in the low voltage subsystem 21 in the system shown in FIG. 2, and, as a result, the DC/DC converter 22 may be of unidirectional design for transporting power from the high voltage subsystem 20 to the low voltage subsystem 21, a starter generator 30 is used in the high voltage subsystem 20 in the case of the architecture shown in FIG. 3. In this case, the DC/DC converter 31 is of bidirectional design, so that the battery 24 can be charged via the low voltage subsystem 21 if need be.

Figure 4:
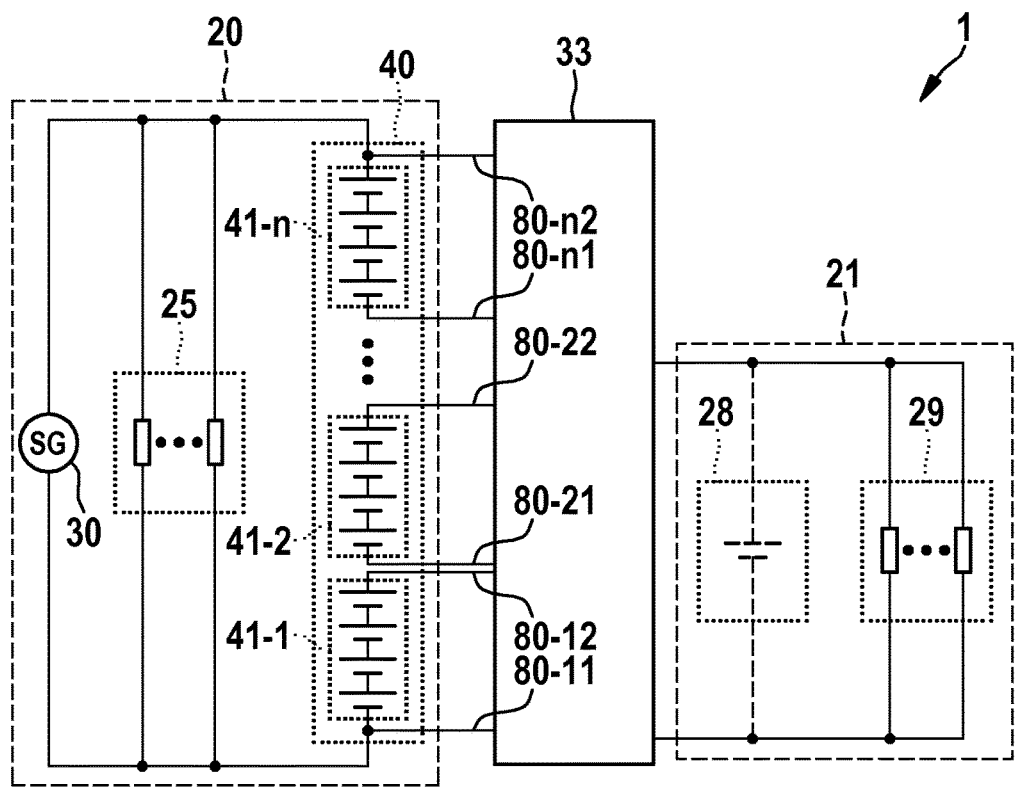
FIG. 4 shows an onboard electrical system with a high voltage subsystem and a low voltage subsystem and a unidirectional, non-isolating DC/DC voltage converter.

FIG. 4 shows an onboard electrical system 1 with a high voltage subsystem 20 and a low voltage subsystem 21, for example an onboard electrical system 1 of a vehicle, particularly of a motor vehicle, transport vehicle or forklift truck. The onboard electrical system 1 is particularly suitable for use in vehicles with a 48 volt generator, a 14 volt starter and a boost recuperation system.

The high voltage subsystem 20 comprises a starter generator 30 that can start an internal combustion engine (not shown) and can be operated by the latter. The starter generator 30 is designed to take a rotary movement of the engine of the vehicle as a basis for producing electric power and supplying it to the high voltage subsystem 20. The high voltage subsystem 20 contains load resistors that may be formed by at least one, preferably by a plurality of, electrical high voltage load(s) 25 of the motor vehicle, for example, that are operated at the high voltage.

The high voltage subsystem 20 furthermore comprises a battery 40 that may be in the form of a lithium ion battery, for example, and that is set up to supply the operating voltage of 48 volts to the high voltage subsystem 20. At a rated voltage of 48 volts, the lithium ion battery 40 preferably has a minimum capacity of approximately 15 Ah in order to be able to store the required electric power.

The battery 40 has multiple battery units 41-1, 41-2, ... , 41-n, wherein the battery units 41 have multiple associated battery cells that are usually connected in series and in some cases are additionally connected in parallel with one another in order to obtain the requisite performance and power data with the battery 40. The individual battery cells are lithium ion batteries with a voltage range from 2.8 to 4.2 volts, for example.

The battery units 41-1, 41-2, ..., 41-n have associated individual voltage taps 80-11, 80-12, 80-21, 80-22, ..., 80-n1, 80-n2 via which the voltage is supplied to a coupling unit 33. The coupling unit 33 is set up to connect at least one of the battery units 41 of the battery 40 to the low voltage subsystem 21 for the purpose of operating or supporting the latter, and to interconnect said battery units in a suitable manner for the high voltage subsystem 20.

The coupling unit 33 couples the high voltage subsystem to the low voltage subsystem 21 and, on the output side, provides the low voltage subsystem 21 with the necessary operating voltage, for example 12 V or 14 V. The design and operation of the coupling unit 33 are described with reference to FIGS. 5 to 7.

The low voltage subsystem 21 comprises the low voltage loads 29, which are designed for operation at 14 V voltage, for example. According to one embodiment, provision is made for the lithium ion battery 40 to undertake the supply of power to quiescent current loads, which are shown as loads 25, 29, when the vehicle is switched off. By way of example, provision may be made for the requirements of what is known as the airport test to be met in this case, wherein the vehicle can still be started after a standing time of six weeks and wherein, during the standing time, the battery provides the quiescent currents for the low voltage loads 29 in the low voltage subsystem 21 so that a theft warning system is supplied with power, for example.

The low voltage subsystem 21 optionally contains an energy store 28 that can temporarily output very high power, i.e. is optimized for high performance, and acts as a buffer store. The energy store 28 achieves the aim of further avoiding overvoltages when the battery units 41 are changed over. If a capacitor is used as the energy store 28, then the dimensioning of said capacitor is preferably:

$$C = \frac{I_{max} \cdot t_{changeover}}{\Delta U_{max}},$$

where $I_{max}$ is the maximum onboard electrical system current that can flow in the onboard electrical system during the changeover processes, $t_{changeover}$ is the period of time during which no battery unit 41 is available for the supply of power, and $\Delta U_{max}$ is the maximum permissible change in the onboard electrical system voltage during the changeover process.

Figure 5:
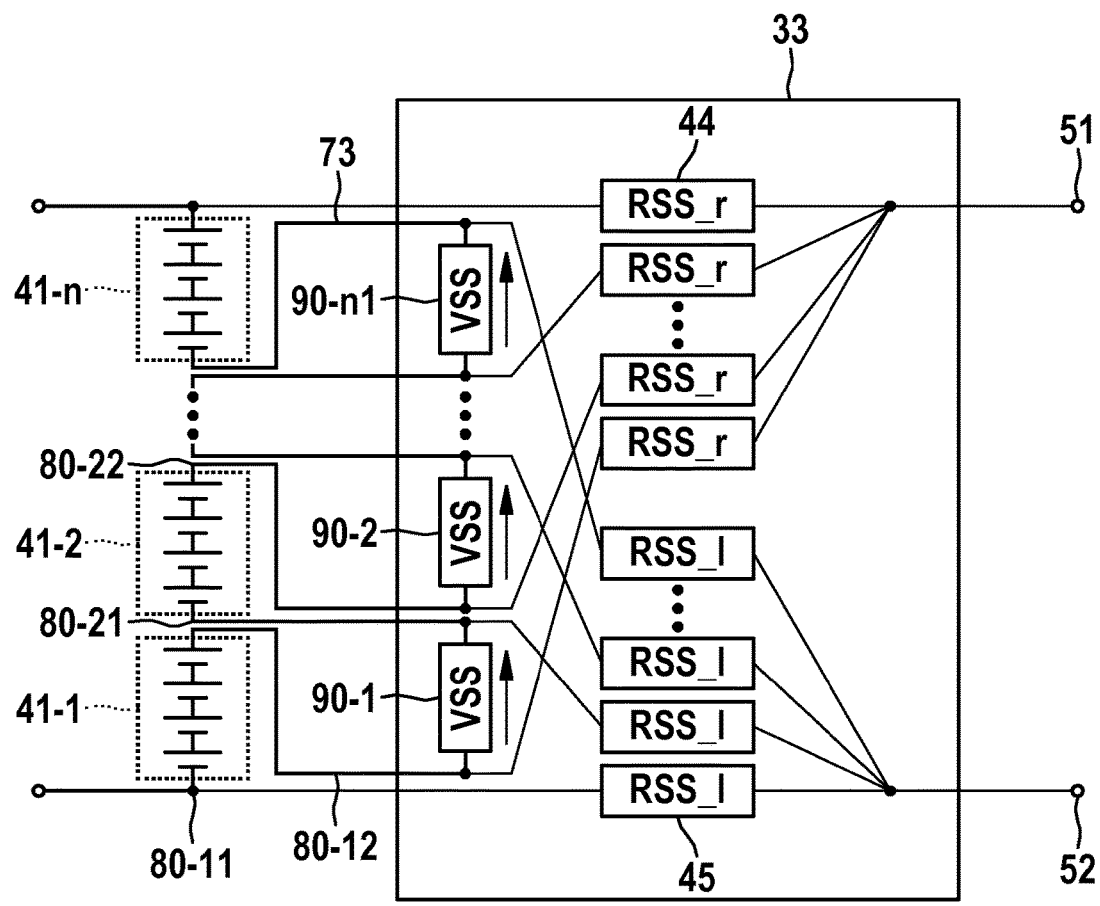
FIG. 5 shows a coupling unit in an exemplary operating state.

FIG. 5 shows a coupling unit 33 that is embodied as a unidirectional, non-isolating DC/DC voltage converter (DC/DC converter). The coupling unit 33 comprises switches with reverse blocking capability 44, 45 that have the property that they allow a flow of current only in one direction in an "on" state and can accept a blocking voltage having both polarities in a second, "off" state. This is a significant difference in relation to simple semiconductor switches, such as e.g. IGBT switches, since these cannot accept a blocking voltage in a reverse direction on account of their intrinsic diode. The dependence on the direction of current flow means that FIG. 5 shows two different switch types, namely RSS_1 45 and RSS_r 44, which need not differ in terms of their manufacture but rather are merely installed with different polarity. An example of the more detailed design of the switches with reverse blocking capability 44, 45 is described with reference to FIG. 9.

In the coupling unit 33, the individual voltage taps 80 of the battery units 41 are each supplied to one of the different switches with reverse blocking capability RSS_1 45 and RSS_r 44. The switches with reverse blocking capability RSS_1 45 are connected to the positive pole 52 on the output side of the coupling unit 33, and the switches with reverse blocking capability RSS_r 44 are connected to the negative pole 51 on the output side of the coupling unit 33.

The coupling unit 33 comprises switches with forward blocking capability VSS 90, which may be standard semiconductor switches, for example. An example of the more detailed design of the switches with forward blocking capability 90 is described with reference to FIG. 9. In the coupling unit 33, the individual taps of the battery units 41 are branched and supplied to a respective switch with forward blocking capability VSS 90 in parallel with the switches with reverse blocking capability. The switches with forward blocking capability VSS 90 connect the battery units 41 to one another in series when the switches with forward blocking capability VSS 90 are closed. In this case, a switch with forward blocking capability VSS 90 is arranged between two respective battery units 41, so that n−1 switches with forward blocking capability VSS 90-1, VSS 90-2, . . . VSS 90-n−1 are provided for n battery units 41.

The reference symbol 73 is used to show the current path through the battery units 41 for supplying power to the high voltage subsystem. All of the switches with forward blocking capability 90 are closed in this case. According to one embodiment, the onboard electrical system or the control system is set up such that the battery 40 is able to supply power to the starter generator 30 only when all of the switches 90 with forward blocking capability are on. Charging the battery 40 does not necessarily require the switches 90 with forward blocking capability to be on, since the intrinsic diodes of the switches 90 with forward blocking capability can carry the charging current. Preferably, the switches 90 with forward blocking capability are switched on whenever there is no parallel mode taking place for the supply of power to the low voltage subsystem 21, in order to reduce the power loss within the switches 90 with forward blocking capability.

The use of the switches 90 with forward blocking capability furthermore allows two or more battery units 41 for supplying power to the low voltage subsystem 21 to be connected in parallel. In this case, the relevant switches 90 with forward blocking capability are controlled to the "off" state, as explained with reference to FIG. 8. When the parallel-connected battery units 41 have different voltage levels, the flow of power to the low voltage subsystem 21 takes place only from that battery unit 41 that has the higher voltage level. The flow of power from the battery unit 41 having the higher voltage to the battery unit 41 having the lower voltage is prevented by the switches 44, 45 with reverse blocking capability that are associated with the battery unit 41 having the lower voltage. While battery units 41 are connected in parallel, the switches 90 with forward blocking capability are off and the generator ideally supplies no power to the high voltage subsystem 20.

Figure 6:
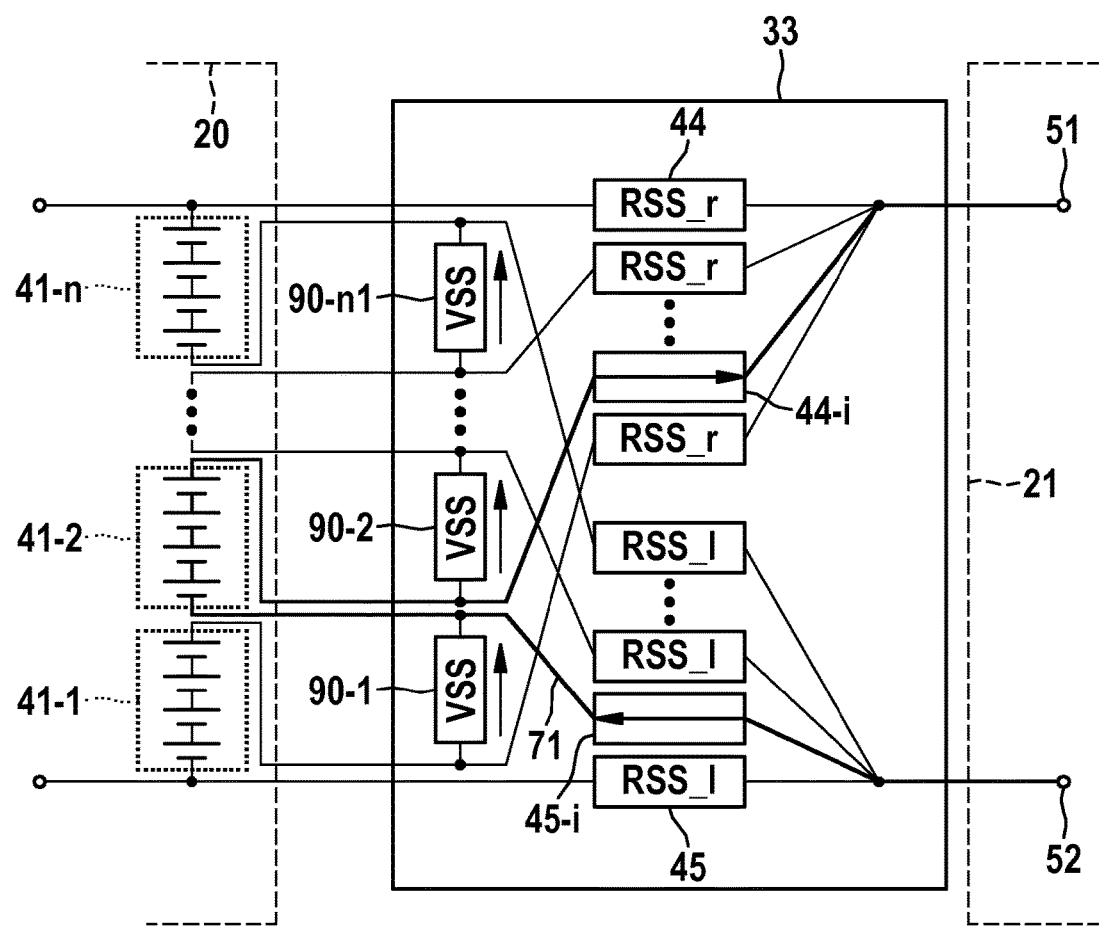
FIG. 6 shows the coupling unit from FIG. 5 in a further exemplary operating state.

FIG. 6 shows the supply of power to the low voltage subsystem 21 by way of example from the battery unit 41-2 via the switches with reverse blocking capability RSS_1 45-i, RSS_r 44-i that are switched on. In this case, a current path 71 leads from the positive pole 52 via the switch with reverse blocking capability RSS_1 45-i, via the second connected battery unit 41-2, via the further switch with reverse blocking capability RSS_r 44-i, to the negative pole 51. The further switches 44, 45 with reverse blocking capability are off in this case.

The voltage of the high voltage subsystem 20 referenced to the ground of the low voltage subsystem 21 is dependent on which of the battery units 41 is or are connected. In none of the operating states does one of the potentials have an absolute value that exceeds a voltage limit amounting to the sum of the high voltage and the low voltage, however, i.e. approximately 62 volts in the case of a 48 volt system and a 14 volt system. Negative potentials relative to the ground of the low voltage subsystem 21 can appear, however.

The operation of the starter generator 30 is independent of the operation of the coupling unit 33 and of the supply of power to the low voltage subsystem 21. In the connected battery unit 41 that supplies power to the low voltage subsystem 21, an overlay results from the low voltage subsystem current and the charging current possibly supplied to the whole battery by the starter generator 30 (generator mode) or from the discharge current drawn from the whole battery 40 (engine mode). So long as the permissible limits of the battery cells, e.g. the maximum permissible discharge current from the cells, are not exceeded, these processes can be considered independently of one another. So that the low voltage subsystem 21 is safely supplied with power, at least one of the battery units 41 is always connected by means of the associated switches 44, 45, 90 of the coupling device 33. The supply of power to the low voltage subsystem 21 on the basis of multiple redundancy means that the presented architecture can be used to design a system that has a very high level of availability for the electric power in the low voltage subsystem 21.

Figure 7:
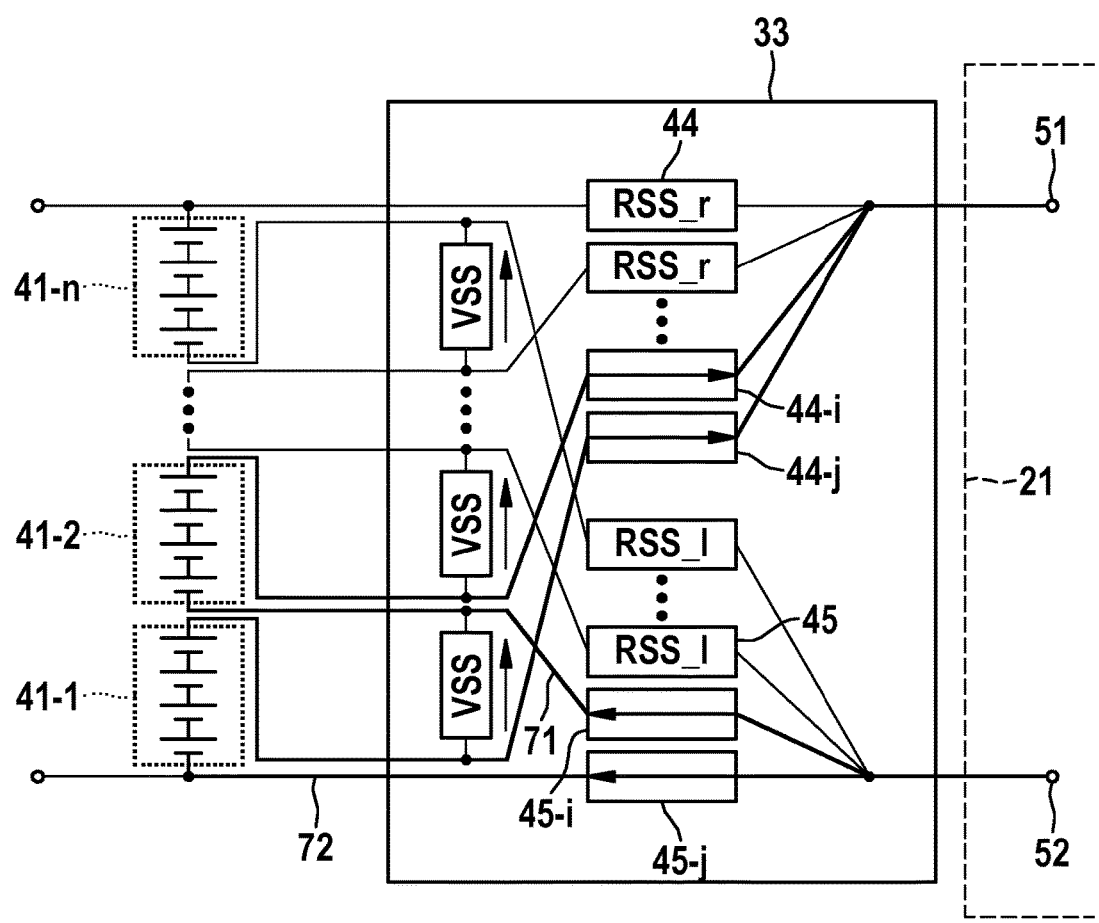
FIG. 7 shows the coupling unit from FIG. 5 in a further exemplary operating state.

FIG. 7 shows the supply of power to the low voltage subsystem 21 by way of example from the battery units 41-1, 41-2 via the switches with reverse blocking capability RSS_1 45-*i*, RSS_1 45-*j*, RSS_r 44-*i*, RSS_r 44-*j* that are switched on. A first current path 71 leads from the positive pole 52 via a switch with reverse blocking capability RSS_1 45-*i*, via the second battery unit 44-2 and via the further switch with reverse blocking capability RSS_r 44-*i*, to the negative pole 51. Furthermore, a further current path 72 leads from the positive pole 52 via the switch with reverse blocking capability RSS_1 45-*j*, via the first connected battery unit 41-1, via the further switch with reverse blocking capability RSS_r 44-*j*, to the negative pole 51.

Figure 8:
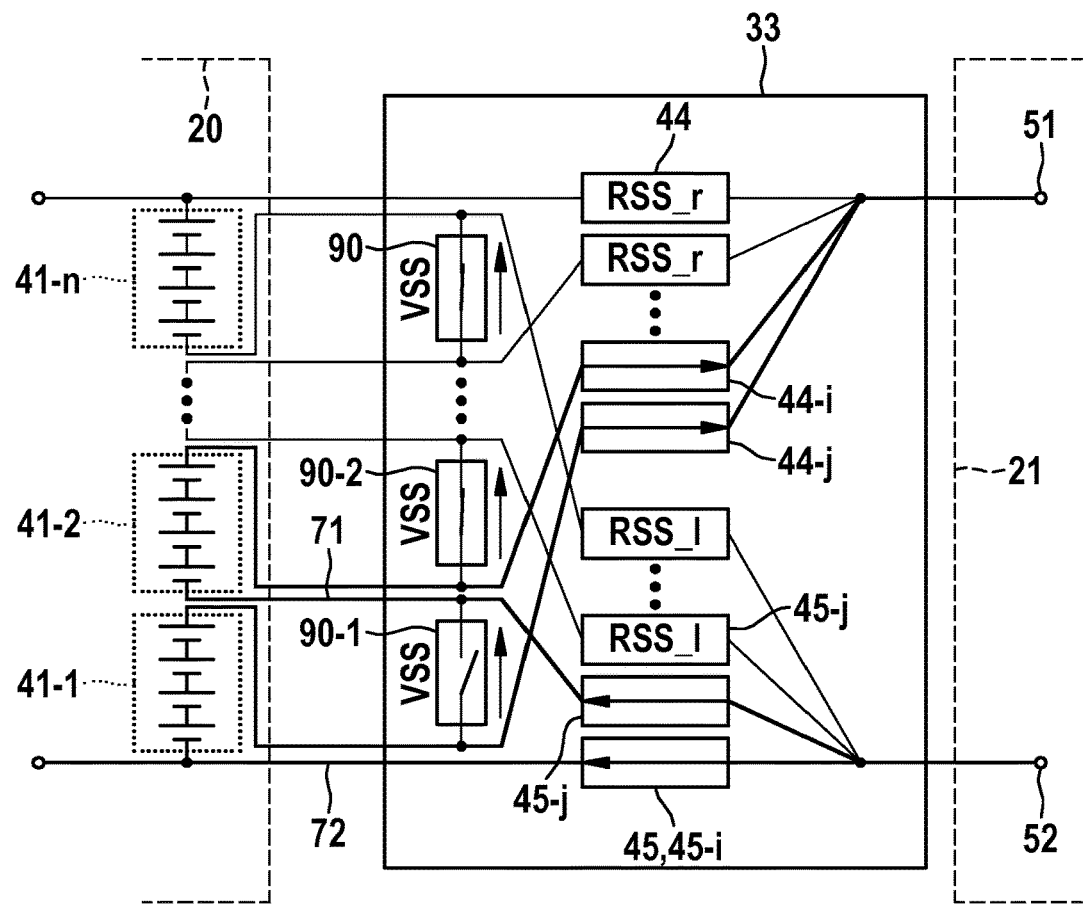
FIG. 8 shows the coupling unit from FIG. 5 in a further exemplary operating state.

FIG. 8 shows the supply of power to the low voltage subsystem 21 by way of example from the battery units 41-1, 41-2 via the switched-on switches with reverse blocking capability RSS_1 45-*i*, RSS_1 45-*j*, RSS_r 44-*i*, RSS_r 44-*j* and the open switch with forward blocking capability VSS 90-1, which is situated between the battery units 41-1, 41-2. From the positive pole 52, a first current path 72 leads via a switch with reverse blocking capability RSS_1 45-*i*, via the first battery unit 41-1 and via the further switch with reverse blocking capability RSS_r 44-*j*, to the negative pole 51. From the positive pole 52, a further current path 71 furthermore leads via the switch with reverse blocking capability RSS_1 45-*j*, via the second connected battery unit 41-2, via the further switch with reverse blocking capability RSS_r 44-*i*, to the negative pole 51. When the switch with forward blocking capability VSS 90-1 is open, the first battery unit 41-1 and the second battery unit 41-2 are connected in parallel for the low voltage subsystem. The positive pole of the first battery unit 41-1 is switched to electrical high impedance in this case.

If the battery units 41 need to be changed over while supplying power to the high voltage subsystem 20 without interruption, then the switches with forward blocking capability 90 must remain switched on. Therefore, a first changeover method is specified in which in a first step a), the switches with reverse blocking capability 44, 45 that are associated with the connected battery units 41 are switched off. In a second step b), the battery units 41 to be connected are then connected to the low voltage subsystem 21 after a delay, the length of which is essentially dependent on properties of the switches 44, 45 used.

If it is necessary to change from battery unit 41-2 to 41-1 in FIG. 7, for example, then the switches with reverse blocking capability 45-*j*, 44-*i* that are associated with the initially current-carrying battery unit 41-2 are switched off and the other switches with reverse blocking capability 45-*i*, 44-*j* are switched on. Were the coupling unit 33 to receive the switching commands for the switches 45-*i*, 44-*i*, 45-*j*, 44-*j* in sync, then the operation of the switches with reverse blocking capability means that the positive pole 52 of the low voltage subsystem would be connected to the higher potential of the two battery units during the switching phase of the power switches and the negative pole 51 would be connected to the lower potential of the two battery units during the switching phase. Hence, a much higher voltage would be applied to the low voltage subsystem 21 for a short time than the specification of the low voltage subsystem allows. In the example shown in FIG. 7, the series-connected battery units 41 mean that the low voltage subsystem 21 would be provided with the sum of the partial voltages from the battery units 41-1, 41-2 for a short time. In order to avoid these overvoltages, the procedure when changing over the coupling unit 33 is as follows:

changeover is effected such that the switches with reverse blocking capability 44-*i*, 45-*j* on the battery unit currently carrying current, the battery unit 41-2 in the example shown, are switched off first and, after the switches on the battery unit 41-2 that has carried current hitherto no longer carry current, the switches with reverse blocking capability 44-*j*, 45-*i* on the battery unit 41-1 that are intended to undertake the supply of power to the low voltage subsystem 21 are switched on. The principle described is also referred to as "break before make".

The delay between switching off and on is necessary because otherwise the voltage in the low voltage subsystem 21 would rise to inadmissibly high values—in the case shown in FIG. 7, to the sum of the voltages of the battery units 41-1 and 41-2, that is to say to double the value—in all switching processes during the transition phase. If the coupling device 33 is switched with a delay time, however, this means that the supply of power to the low voltage subsystem 21 is briefly interrupted. In order to avoid an inadmissible voltage dip, it is possible, in accordance with some embodiments, for buffering by means of the energy store 28 to be performed. If the energy store 28 used is a capacitor, then it is dimensioned preferably as described with reference to FIG. 4.

The voltage dip in the low voltage subsystem 21 can additionally advantageously be decreased if changeover is effected at times at which the onboard electrical system current is as small as possible. This can be accomplished by evaluating a signal for the onboard electrical system current and actuating the switches of the coupling unit on the basis thereof, for example. Furthermore, synchronization to a load management system can also be effected in order to disconnect high voltage loads, such as e.g. heating systems, temporarily without losses of comfort in order to allow the changeover process for the battery units without a significant voltage dip.

For the further case in which the supply of power to the low voltage subsystem 21 is not to be interrupted, a further changeover method is provided, wherein in a first step c) all of the switches with forward blocking capability 90 are switched off. In the changeover phase, the starter generator 30 feeds no power to the high voltage subsystem and also does not operate in boost mode. After a short delay, the length of which is dependent on properties of the switches used, the switches with reverse blocking capability 44, 45 in the associated battery unit or battery units 41 to be connected are switched on in a second step d). In an optional third step e), if there is provision for the battery unit 41 connected to the low voltage subsystem 21 to be changed, the first, connected battery unit 41-1 is disconnected from the low voltage subsystem 21. In this case, the change can also be made between battery units 41 that are not directly adjacent. In a fourth step d), the switches with forward blocking capability 90 are connected again. After the connection has been restored, the parallel connection of the two battery units or the commutation from the first to the second battery unit is complete, without the supply of power to the low voltage subsystem 21 having been interrupted.

The selection of the changeover methods is made by the control system, for example on the basis of which subsystem should be supplied with power as a matter of priority. A further option provided may be to transfer to a mode with reduced voltage in operating phases in which the full power or the full voltage of the battery is not needed in the high voltage subsystem. It is then possible for the coupling unit 33 to be used to supply power to the low voltage subsystem without interruption.

Figure 9:
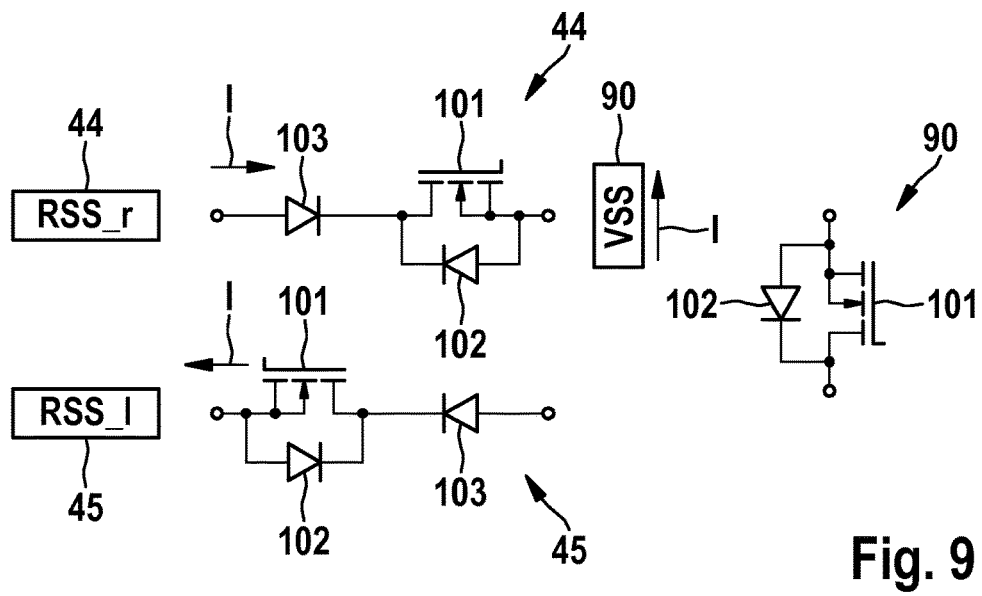
FIG. 9 shows switches with reverse and forward blocking capability.

FIG. 9 shows a possible design for switches with reverse blocking capability 44, 45 and switches with forward blocking capability 90. In this case, the forward direction of the switches is indicated by 1. A switch with reverse blocking capability RSS_r 44 comprises an IGBT, MOSFET or bipolar transistor 101 and a diode 103 connected in series therewith, for example. FIG. 9 shows a MOSFET that has an intrinsic diode 102, which is also shown. The diode 103 connected in series with the MOSFET 101 is biased in the opposite direction to the intrinsic diode 102 of the MOSFET 101. The switch with reverse blocking capability RSS_r 44 allows the current to pass in the forward direction 1 and blocks in the opposite direction. The switch with reverse blocking capability RSS_1 45 corresponds to the RSS_r 44, is merely installed with the opposite polarity, so that the forward and reverse directions are interchanged. A switch with forward blocking capability 90 comprises a MOSFET, IGBT or bipolar transistor 101, the intrinsic diode 102 of which is also shown. The switches RSS_1 45, RSS_r 44 and VSS 90 are particularly also distinguished by a barely noticeable delay in the switching processes, i.e. allow a very short changeover period. A suitable actuating circuit can be used to set the time delay between the switches being switched off and switched on very accurately.

Figure 10:
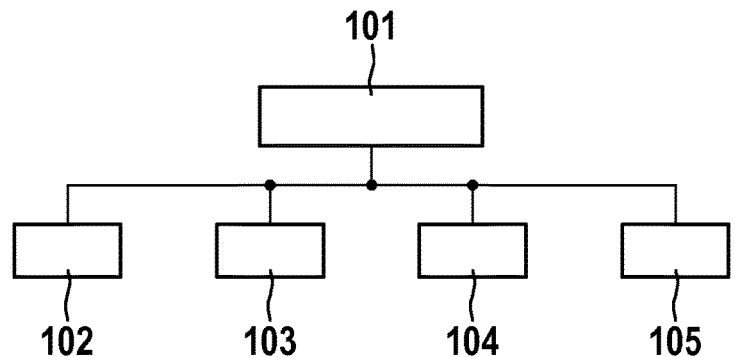
FIG. 10 shows settings for operating states on the basis of operating phases.

FIG. 10 shows the setting of switching states on the basis of different operating phases. FIG. 10 shows four different operating phases 102, 103, 104, 105, the detection or setting of which leads to changeover 101 of the switching states of the coupling device. A first operating phase 102 is a passive phase of the system, for example a switched-off vehicle or parked vehicle. A second operating phase 103 is a starting phase of the system, for example a motor vehicle start. A third operating phase 104 is a start/stop phase of the system, for example a start/stop mode of a motor vehicle. A fourth operating phase 105 is an active phase of the system, for example a driving mode of the vehicle.

The battery on which FIGS. 10 to 14 are based comprises four battery units by way of example, said battery units each being able to provide the high voltage subsystem with a 12 V voltage. In this case, the coupling unit is set up to provide at least the following operating states:

| Configuration | Switching states | High voltage subsystem | Low voltage subsystem |
|---|---|---|---|
| 1s4p | 3 switches with forward blocking capability between 4 adjacent battery units switched off, 8 switches with reverse blocking capability on these battery units switched on | 12 V | Supply of power from the 1s4p battery unit |
| 2s1p + 1s2p | 1 switch with forward blocking capability between 2 adjacent battery units switched off, 4 switches with reverse blocking capability on these battery units switched on | 36 V | Supply of power from the 1s2p battery unit |
| 1s1p + 1s3p | 2 switches with forward blocking capability between 3 adjacent battery units switched off, 6 switches with reverse blocking capability on these battery units switched on | 24 V | Supply of power from the 1s3p battery unit |
| 4s1p | All switches with forward blocking capability switched on, 2 switches with reverse blocking capability for low voltage subsystem switched on | 48 V | Supply of power from one of the 4 battery units |

The table shows configurations for the battery that are able to be set using the coupling device. XsYp means X cells connected in series and Y cells connected in parallel. By way of example, 2s1p means a series circuit comprising two battery units and 1s2p means a parallel circuit comprising two battery units.

Figure 11:
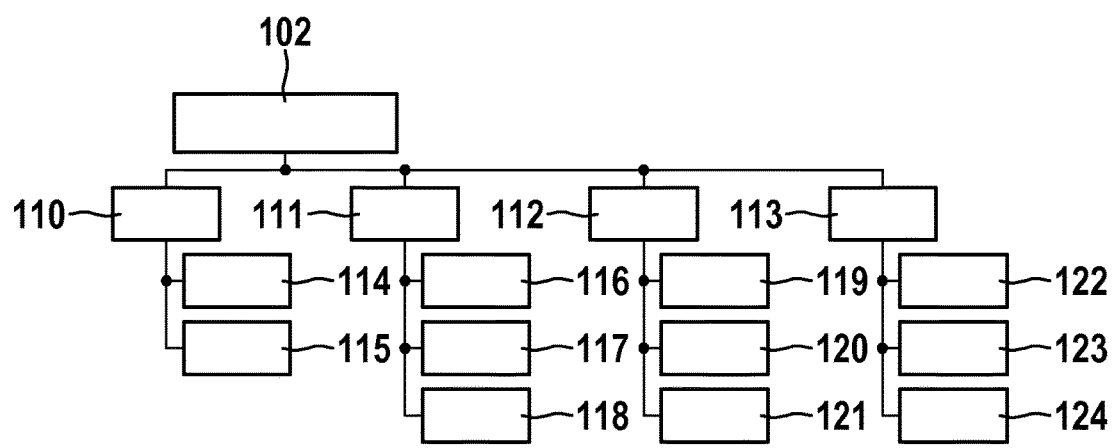
FIG. 11 shows operating states and their properties in a first operating phase.

FIG. 11 shows configurations for the battery system in the first operating phase 102, i.e. when the vehicle is switched off, for example.

A first configuration 110 is 1s4p, i.e. one battery unit is connected to the high voltage subsystem and all, i.e. in this case four, battery units are connected in parallel for the low voltage subsystem. This configuration is preferred for the first operating phase 102. It is set when quiescent operation of the high voltage subsystem by virtue of the voltage that can be provided by only one battery unit is possible. In the configuration 110, a supply of power 114 to the high voltage subsystem is provided using the power that can be provided by one battery unit. In addition, balancing 115 of the battery units can be effected, i.e. equalization of the charges in the individual battery units. When the battery unit is connected in parallel for the 1s4p configuration 110, the battery unit having the highest state of charge is discharged automatically, and balancing of the battery units ensues.

In a second configuration 111, namely 2s1p+1s2p, wherein a switch with forward blocking capability between two adjacent battery units is off and four switches with reverse blocking capability on these battery units are on, the supply of power 116 to the high voltage subsystem is provided at a reduced voltage, in this case at half the high voltage, for example. Balancing 117 of the battery units is possible by changing the supply of power to the low voltage subsystem. A supply of power 118 to the low voltage subsystem is possible without interruption when the battery unit changes.

In a third configuration 112, namely 1s1p+1s3p, in which two switches with forward blocking capability between three adjacent battery units are off and six switches with reverse blocking capability on these battery units are on, a supply of power 119 to the high voltage subsystem is provided at a reduced voltage, in this case at three quarters of the high voltage, for example. Balancing 120 of the battery units can be effected by means of a change in the supply of power 121 to the low voltage subsystem. A supply of power 121 to the low voltage subsystem is possible without interruption in this case.

The second and third configurations 111, 112 are preferably set when, although the high voltage subsystem can be supplied with power at reduced voltage, this voltage is necessarily higher than the low voltage that can be provided by a battery unit. In all configurations with the exception of the first configuration 110, the balancing of the battery units is performed by means of a change of that battery unit that is used to supply power to the low voltage subsystem. Such a change can be carried out either with a brief interruption to the direct supply of power to the low voltage subsystem from a battery unit and hence using appropriate measures for buffering the onboard electrical system, for example by means of a capacitor, or with an uninterrupted supply of power to the low voltage subsystem. In the latter case, however, it must be accepted in the changeover phase that the voltage in the high voltage subsystem is limited briefly, for example to two thirds.

If the high voltage subsystem is intended to be supplied with power at the high voltage in the first operating phase 102 too, then a fourth configuration 113, namely 4s1p, can be set. In this configuration, a supply of power 122 to the high voltage subsystem is provided at the total voltage of the battery units, and additionally, balancing 123 of the battery units can be effected by means of a change in the supply of power to the low voltage subsystem. The supply of power 124 to the low voltage subsystem is provided from a single battery unit. In the event of a change of connected battery unit, the supply of power 124 to the low voltage subsystem is not provided without interruption, or there is a dip in high voltage supply 122.

In the fourth configuration 113, the supply of power to the low voltage subsystem is provided during the parking phase from that battery unit that has the highest state of charge. This selection specification ensures that the battery unit having the highest state of charge is discharged more quickly than the other battery units.

Figure 12:
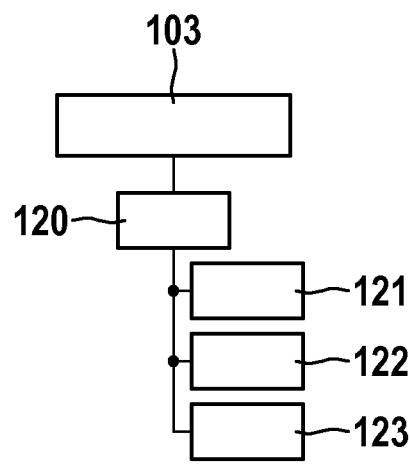
FIG. 12 shows operating states and their properties in a second operating phase.

FIG. 12 shows the setting of the switching states in the second operating phase 103, for example the starting of the motor vehicle. So that the system can output its maximum possible power on the high voltage subsystem side, all battery units are connected in series for a configuration 120, i.e. in the example with four battery units, for 4s1p. Hence, a supply of power 121 to the high voltage subsystem is provided at the maximum possible power of the battery, and a supply of power 122 to the low voltage subsystem is provided from that battery unit having the highest state of charge (SOC). In this case, that battery unit that has the highest state of charge is selected. Furthermore, optimization 123 of the SOC difference in the battery units is effected.

Figure 13:
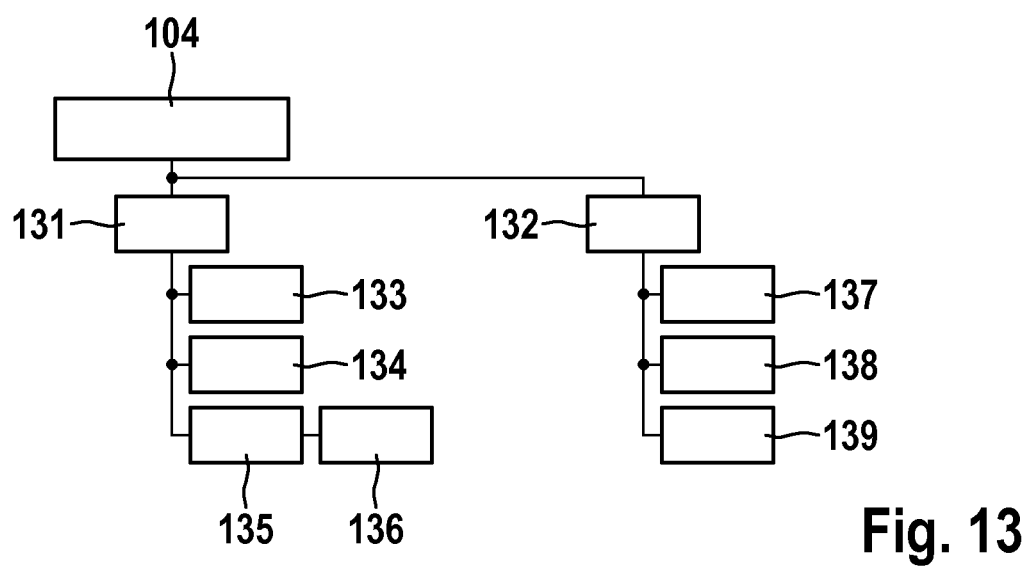
FIG. 13 shows operating states and their properties in a third operating phase.

FIG. 13 shows the configuration of the battery system for the third operating phase 104, for example the start/stop mode. The third operating phase 104 has a stop mode 131 and a start mode 132. During the stop mode 131, the same statements apply as for the first operating phase 102, which has been described with reference to FIG. 11. The selection of the configuration of the battery system is therefore made preferably according to the same criteria. If the high voltage subsystem can manage with a low voltage for the stop mode 131, then the configuration 1s4p is preferably set. A supply of power 133 to the high voltage loads is provided at the power that is provided by a battery unit. A supply of power 134 to the low voltage loads is provided from that battery unit having the highest SOC. Furthermore, optimization 135 of the SOC difference in the battery units and optimization 136 are effected to obtain the performance for starting. For the subsequent start mode, there is a change to the configuration 132. In this case, there is an output 137 of maximum power for starting by the battery, a supply of power 138 to the low voltage subsystem from that battery unit having the highest SOC and optimization 139 of the SOC difference in the battery units.

Figure 14:
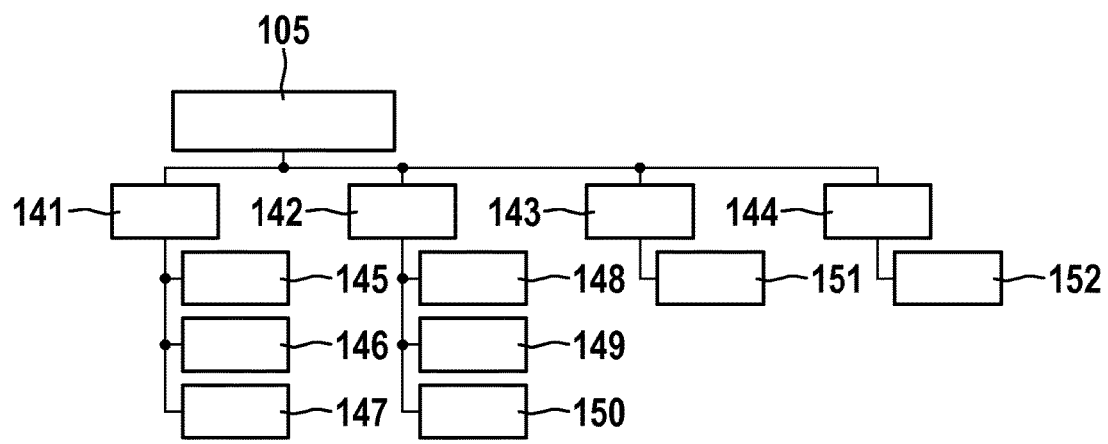
FIG. 14 shows operating states and their properties in a fourth operating phase.

FIG. 14 shows the configuration of the battery system in the fourth operating phase 105, for example during driving mode. The fourth operating phase 105 has a boost operating state 141 and a recuperation operating state 142, and also an operating state 143, in which states the starter generator feeds no power to the onboard electrical system, and an operating state 144, in which states the starter generator feeds only a small amount of electric power to the onboard electrical system, for example less than 12 V or than 24 V.

In the boost operating state 141, the battery system needs to be able to output the highest possible power to the starter generator, and in the recuperation operating state 142, it needs to be able to be charged with the highest possible power. Additionally, as much power as possible needs to be able to be provided or accepted in these two modes 141, 142. Therefore, the configuration 4s1p is set in these two modes 141, 142. In the boost operating state 141, there is an output 145 of maximum power for the boost by the battery, a supply of power 146 to the low voltage subsystem from that battery unit having the highest SOC and optimization 147 of the SOC difference in the battery units. In the recuperation operating state 142, there is charging 148 with maximum power by the battery, a supply of power 149 to the low voltage subsystem from that battery unit having the highest SOC and optimization 150 of the SOC difference in the battery units.

In the operating states 143, 144, in which the starter generator supplies no power to the onboard electrical system or supplies only a small amount of electric power to the onboard electrical system, for example in order to cover the power requirement when a recuperation phase has not occurred for a relatively long time, it is possible for all four configurations 1s4p, 2s1p+1s2p, 1s1p+1s3p or 4s1p to be set, in principle, as indicated by reference signs 151 and 152. In these phases of no or low generator power 143, 144, the statements made for the switched-off vehicle operating phase apply. If the voltage in the high voltage subsystem can be lowered to the low voltage in such operating phases, then setting of the 1s4p configuration is preferred. The onboard electrical system of said vehicle then behaves almost as a standard low voltage onboard electrical system, in which the generator covers the average onboard electrical system load.

The approach described allows the switching states of the coupling device to be set for all four different operating phases 102, 103, 104, 105 of the vehicle according to a defined specification. In such passages of the description as still leave options or alternatives open, the constraint in the specific embodiment of the high voltage subsystem provides clarity, for example the possibility of also operating the high voltage subsystem at low voltage.

The operating state 1s4p is of interest particularly also when the high voltage subsystem is used not for supplying power to high voltage loads but rather for optimizing the maximum power of the starter generator. For moderate powers, the generator can then be operated at the low voltage, and the effect achieved by the parallel connection of all battery units is that an onboard electrical system having a similar function to the low voltage subsystem according to the prior art today is obtained. The generator can deliver the average onboard electrical system current directly, and in this state, the battery serves as a buffer store. If all battery units are connected to the low voltage subsystem supply in parallel by means of the switches of the coupling unit, then that battery unit having the highest state of charge is automatically discharged, and the balancing of the battery units automatically ensues. If, on the basis of this state, high power from the starter generator is required, for example in boost mode, or, in a recuperation process, power can be fed back at such a high output level that this is unimplementable in the low voltage mode of the starter generator, then the battery is reconfigured to a 4s1p configuration by means of changes in the switching states in the coupling unit. When using fast semiconductor circuits in the coupling device, the switching times required for this can be kept very short.

The disclosure is not limited to the exemplary embodiments described here and the aspects highlighted therein. Rather, a multiplicity of modifications that lie within the scope of action of a person skilled in the art are possible within the area specified by the disclosure.

The invention claimed is:

1. An onboard electrical system for a motor vehicle, the onboard electrical system comprising:
    a first subsystem having at least one first load configured to operate with a first voltage;
    a second subsystem having at least one second load configured to operate with a second voltage, the second voltage being higher than the first voltage;
    a starter generator;
    a coupling unit configured to connect the second subsystem to the first subsystem, the coupling unit being configured to provide at least a first operating state and a second operating state; and
    a battery configured to produce the second voltage and to supply the second voltage to the second subsystem, the battery including a plurality of battery units having individual voltage taps that are routed to the coupling unit,
    wherein, in the first operating state, the second subsystem is fed from a series connection of all of the plurality of battery units and the first subsystem is fed from only one of the plurality battery units, and
    wherein, in the second operating state, the second subsystem is fed from a parallel connection of at least some of the plurality of battery units and the low voltage subsystem is fed the parallel connection of the at least some of the plurality of battery units.

2. The onboard electrical system as claimed in claim 1, wherein the battery units in the plurality of battery units are each configured to provide the first voltage.

3. The onboard electrical system as claimed in claim 1, wherein the coupling unit includes at least one of switches with reverse blocking capability and switches with forward blocking capability.

4. The onboard electrical system as claimed in claim 1, wherein, in the second operating state, the second subsystem is fed from a parallel connection of all of the plurality of battery units and the low voltage subsystem is fed from the parallel connection of all of the plurality of battery units.

5. The onboard electrical system as claimed in claim 1, wherein:
    the plurality of battery units include at least three battery units;
    the coupling unit is configured to provide at least one further operating state;
    in each of the at least one further operating states, the second subsystem is fed from a parallel and series connection of all of the plurality of battery units and the low voltage subsystem is fed from a parallel connection of a subset of the plurality of battery units.

6. The onboard electrical system as claimed in claim 5, wherein, in one of the at least one further operating states, the second subsystem is fed from a parallel connection of a subset of the plurality of battery units which is in series with each remaining battery unit in the plurality of battery units, and the low voltage subsystem is fed from the parallel connection of the subset of the plurality of battery units.

7. A motor vehicle comprising:
    an internal combustion engine; and
    an onboard electrical system, the onboard electrical system comprising:
        a first subsystem having at least one first load configured to operate with a first voltage;
        a second subsystem having at least one second load configured to operate with a second voltage, the second voltage being higher than the first voltage;
        a starter generator;
        a coupling unit configured to connect the second subsystem to the first subsystem, the coupling unit being configured to provide at least a first operating state and a second operating state; and
        a battery configured to produce the second voltage and to supply the second voltage to the second subsystem, the battery including a plurality of battery units having individual voltage taps that are routed to the coupling unit,
        wherein, in the first operating state, the second subsystem is fed from a series connection of all of the plurality of battery units and the first subsystem is fed from only one of the plurality battery units, and
        wherein, in the second operating state, the second subsystem is fed from a parallel connection of at least some of the plurality of battery units and the low voltage subsystem is fed from the parallel connection of the at least some of the plurality of battery units.

8. A method for operating an onboard electrical, the onboard electrical system including (i) a first subsystem having at least one first load configured to operate with a first voltage, (ii) a second subsystem having at least one second load configured to operate with a second voltage, the second voltage being higher than the first voltage, (iii) a starter generator, (iv) a coupling unit configured to connect the second subsystem to the first subsystem, the coupling unit being configured to provide at least a first operating state and a second operating state, and (v) a battery configured to produce the second voltage and to supply the second voltage to the second subsystem, the battery including a plurality of battery units having individual voltage taps that are routed to the coupling unit, the method comprising:
    controlling the coupling unit to provide the first operating state depending on an operating phase of the motor vehicle, wherein, in the first operating state, the second subsystem is fed from a series connection of all of the plurality of battery units and the first subsystem is fed from only one of the plurality of battery units; and
    controlling the coupling unit to provide the second operating state depending on the operating phase of the motor vehicle, wherein, in the second operating state, the second subsystem is fed from a parallel connection of at least some of the plurality of battery units and the low voltage subsystem is fed from the parallel connection of the at least some of the plurality of battery units.

9. The method as claimed in claim 8, wherein at least one of:
    a first operating phase of the motor vehicle is at least one of a switched-off vehicle and parked vehicle;

a second operating phase of the motor vehicle is a motor vehicle start;

a third operating phase of the motor vehicle is a start/stop mode of the motor vehicle; and a fourth operating phase of the motor vehicle is a driving mode of the motor vehicle.

10. The method as claimed in claim 8, further comprising:

supplying, in the first operating state, the low voltage subsystem with power from that battery unit of the battery that has a highest state of charge.

* * * * *